United States Patent [19]

Murata et al.

[11] Patent Number: 4,570,482
[45] Date of Patent: Feb. 18, 1986

[54] LOAD-SENSITIVE LEVEL DETECTING DEVICE

[75] Inventors: Michihiro Murata, Kyoto; Akira Kumada, Ootsu, both of Japan

[73] Assignee: Murata Manufacturing Co., Ltd., Japan

[21] Appl. No.: 486,371

[22] Filed: Apr. 19, 1983

[30] Foreign Application Priority Data

Apr. 23, 1982 [JP] Japan ................... 57-69388
May 21, 1982 [JP] Japan ................... 57-86923

[51] Int. Cl.$^4$ ............................................. G01F 23/00
[52] U.S. Cl. ................................. 73/290 V; 340/612
[58] Field of Search ............... 73/290 V, 662, 665, 73/702, 704, DIG. 1, DIG. 4; 340/612, 613, 614, 621

[56] References Cited

U.S. PATENT DOCUMENTS 2,376,304   5/1945   Anderson ........................... 340/614
4,107,994   8/1978   Sogo ................................. 73/290 V

FOREIGN PATENT DOCUMENTS 2529239   2/1977   Fed. Rep. of Germany ... 73/290 V
0039158   3/1979   Japan ................................. 73/290 V
0037782   3/1979   Japan ................................. 73/290 V

*Primary Examiner*—Charles Frankfort
*Assistant Examiner*—Patrick R. Scanlon
*Attorney, Agent, or Firm*—Ostrolenk, Faber, Gerb & Soffen

[57] ABSTRACT

A load-sensitive level detecting device for detecting the level of a powder or liquid comprises a piezoelectric vibrator (3), a case (1) which separates the object whose level is to be detected from the latter, the case (1) being formed with an opening (1b), which is closed by an elastic sheet (2) serving as a movable detecting section, whereby when the load exerted by the object is applied to the elastic sheet (2), the vibration of the piezoelectric vibrator (3) is constrained.

6 Claims, 19 Drawing Figures

VIBRATING · DETECTING   OUTPUT CIRCUIT   DISPLAYING OR
CIRCUIT                                  CONTROLLING CIRCUIT

LOAD-SENSITIVE LEVEL DETECTING DEVICE

BACKGROUND OF THE INVENTION

1. Field of the Invention

This invention relates to a load-sensitive level detecting device for detecting the amount of a powder, such as the toner in an electronic duplicating machine or cereal, remaining in a storage container or detecting the level of a fluid, such as the juice or coffee, in an automatic vending machine, and more particularly it relates to a load detecting device for detecting a powder or fluid by using a piezoelectric vibrator.

2. Description of the Prior Art

Devices have heretofore been known which are used to detect the level of a powder or liquid by bringing a piezoelectric vibrator in the form of a piezoelectric tuning fork or piezoelectric tuning bar into contact with the powder or liquid and thereby electrically detecting stoppage or attenuation of its vibration.

With these conventional devices, however, if used in detecting the level of a powder, particularly extrafine particles such as the toner used in duplicating machines, there is a fatal disadvantage in that because of the extrafine particles, the mass of the powder is small and the cohesion and adhesion are sufficiently high for the powder to remain stuck to the surface of the piezoelectric vibrator even if the powder level reduce below the level of installation of the piezoelectric vibrator, resulting in constraining the vibration of the piezoelectric vibrator and causing a malfunction.

To eliminate this drawback, a technique for removing the accumulated or stuck powder by causing forced vibration of the piezoelectric vibration of the piezoelectric vibrator after the powder level has been detected is disclosed in Japanese patent application No. 3378/1978 (Patent Laid-Open No. 94754/1979). However, this prior technique produces a new drawback that the arrangement of the device becomes considerably complicated.

Further, a technique for reducing accumulation of the powder by using an I-shaped tuning bar is disclosed in Japanese patent application No. 103679/1977 (Patent Laid-Open No. 37782/1979). However, this prior technique, as compared with the one using a piezoelectric tuning bar of general shape, has a drawback that the device is difficult to oscillate and inferior in its detecting ability.

Further, U.S. Pat. No. 4,314,242 dated Feb. 2, 1982 and granted to Hiroshi Kuru and Mitsuo Akiyama discloses a method of detecting the remaining amount of the toner by using a hopper whose wall surface is locally provided with a vibrator formed with electrodes on both surfaces thereof. With this prior patent, since the vibrator is formed on the wall surface of the hopper, there is no possibility of the toner sticking to the surface facing to the outside of the hopper. Therefore, the lowering of the detection accuracy due to the toner sticking to the vibrator can be reduced. However, since the inner surface of the vibrator is still in direct contact with the toner, even if the remaining amount of the toner has decreased, some toner remains stuck to the piezoelectric vibrator, thus constraining the piezoelectric vibrator. Therefore, the possibility of causing malfunction in detecting the level of the remaining amount of the toner still remains.

SUMMARY OF THE INVENTION

Accordingly, a principal object of the invention is to provide a load-sensitive level detecting device eliminating the drawbacks described above, which device is applicable to extrafine particles of high cohesion and adhesion and to liquids, causes little malfunction and is small in size and simple in arrangement.

Another object of this invention is to provide a load-sensitive level detecting device for detecting the level of an image forming material, which device is applicable to an image forming material in the form of fine particles such as a toner of high cohesion and adhesion or to an image forming material in the form of a liquid such as a developing solution or ink.

A further object of this invention is to provide a load-sensitive level detecting device used for detecting the stored amount of particulate cereals such as wheat and rice and also used with a remaining amount detecting device in an automatic vending machine for selling coffee or juice.

Briefly, the invention is a load-sensitive level detecting device for detecting the level of a powder or liquid, including a piezoelectric vibrator, means for exciting said piezoelectric vibrator, and means for detecting the vibration of said piezoelectric vibrator, said device being characterized by the provision of isolating means for isolating an object of detection and said piezoelectric vibrator from each other, said isolating means being provided with a movable detecting section adapted to come in contact with said object, whereby when the load due to said object is applied to said movable detecting section, the vibration of the piezoelectric vibrator is constrained.

The isolating means may comprise a case having an opening formed in a portion of the wall surface thereof, and surrounding the piezoelectric vibrator, and a movable detecting section adapted to close said opening. As for the piezoelectric vibrator, it is possible to use various forms of piezoelectric vibrator such as a piezoelectric tuning fork and piezoelectric tuning bar.

Other objects and features of this invention will become more apparent from the following detailed description to be given with reference to the drawings.

DESCRIPTION OF THE PREFERRED EMBODIMENTS

Figure 1:
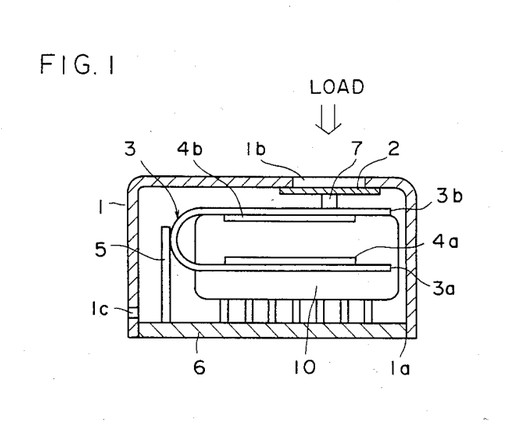
FIG. 1 is a sectional view taken along the line A—A in FIG. 2, showing a load-sensitive level detecting device according to an embodiment of this invention.

In FIG. 1, a case 1 serving as isolating means has a hole 1b formed in the surface thereof opposite to its open end 1a, and an elastic sheet 2 constituting a movable detecting section is fixed to the periphery of the hole 1b by an adhesive agent so as to cover said hole 1b. The thickness of the elastic sheet 2 will be selected in the range of 10 μm to 1 mm, assuming that a load of 0.1 mg to 10 g per cm$^2$ due to the substance to be detected is imposed on the elastic sheet 2. The reason for this is that if the thickness of the elastic sheet 2 is less than 10 μm, the elastic sheet 2 becomes weak and thus it is not easily handled. On the other hand, if the thickness of the elastic sheet 2 is more than 1 mm, the sensitivity of the elastic sheet 2 decreases due to increase of mass of the elastic sheet 2. Disposed within the case 1 is a U-shaped piezoelectric tuning fork 3 having an exciting piezoelectric element 4a bonded to the inner surface of one vibrating leg 3a of the U-shaped piezoelectric tuning fork 3 and a receiving or vibration detecting piezoelectric element 4b bonded to the inner surface of the other vibrating leg 3b. The piezoelectric tuning fork 3 is attached to an attaching plate 6 by a support 5 attached to the bend in the tuning fork, in such a manner as to allow the vibrating legs 3a and 3b to vibrate at right angles to the surface of the attaching plate 6. The other vibrating leg 3b of the piezoelectric tuning fork 3 has a pillar 7 attached to the outer surface in the region intermediate it opposite ends, the other end of said pillar 7 being contacted with or fixed to the elastic sheet 2. The position at which the pillar 7 is attached is not limited to the intermediate region. For example, it may be attached to the open end of the vibrating leg 3b. Thus, the position may be suitably determined in relation to the material of an object of detection and to detection sensitivity. The material of the pillar 7 may be one having rigidity or elasticity. If it is formed of rubber having elasticity, it is possible to absorb dimensional variation and facilitate production.

Figure 2:
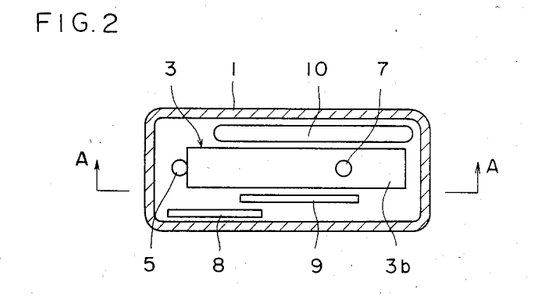
FIG. 2 is a plan view of said load-sensitive level detecting device, with part of a case serving as isolating means being removed, for clarity.
Figure 3:
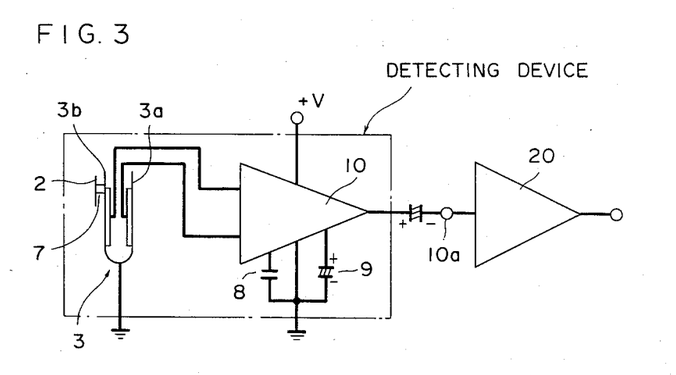
FIG. 3 is an equivalent circuit diagram of the load-sensitive level detecting device shown in FIGS. 1 and 2.

The attaching plate 6 has a wiring pattern (not shown) applied thereto, and capacitors 8 and 9 (FIG. 2) and an oscillator hybrid IC 10, together with the support 5 (ground), are installed at predetermined location of the plate 6. Lead wires are electrically connected, to the elements as shown in FIG. 3. Further, the case 1 is formed with a vent hole 1c, preventing the pressure in the case 1 from changing with temperature change and from adversely affecting the detecting section. By utilizing this vent hole 1c, it is possible to withdraw the lead wires leading from the hybrid IC 10.

When power is applied to the hybrid IC 10 having an amplifier built therein, a signal is applied to the exciting piezoelectric element 4a to vibrate the vibrating legs 3a and 3b. This vibration is detected by the detecting piezoelectric element 4b and positively fed back to the amplifier, with the result that the oscillation is sustained. When a load, produced for example by a powder, is imposed on the elastic sheet 2 of the detecting section, the vibration of the detecting vibrating leg 3b joined to the pillar 7 is constrained. Thus, the positive feedback loop is cut and oscillation stops. Due to the cessation of the oscillation, a detection signal appears at the detecting terminal 10a. This detection signal is fed to a control circuit 20, which controls the circuit in the next stage. The control circuit 20 may be located in the case 1. While the piezoelectric tuning fork 3 has been driven by self-excitation or oscillation in the above embodiment, in this invention it may be driven by separate excitation.

Figure 4:
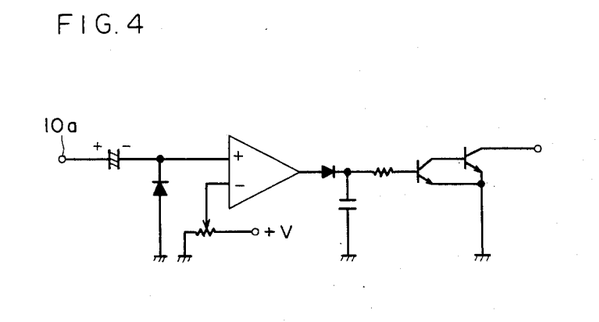
FIG. 4 is a view showing a concrete example of an output circuit in the circuit of FIG. 3.
Figure 5:
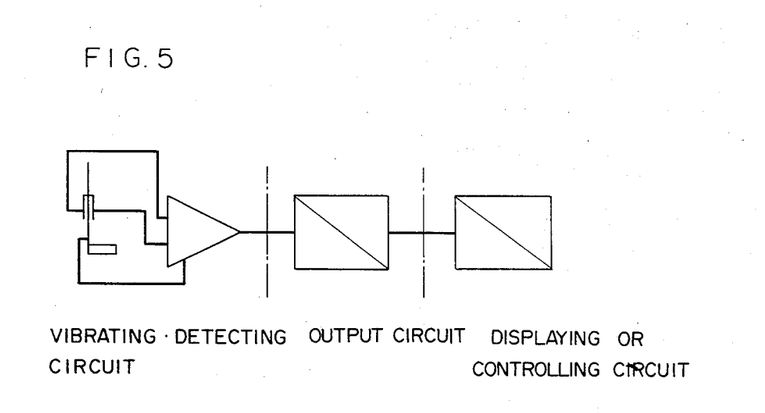
FIG. 5 is a block diagram of the load-sensitive level detecting device shown in FIGS. 1 and 2.

FIG. 4 shows an example of an output circuit, to which the output of FIG. 1 can be applied and FIG. 5 is a block diagram including an a display circuit or control as the next stage circuit connected to the output circuit. The display circuit or control circuit includes a remaining amount indicating lamp, a sound reporting system, a relay circuit and a driving circuit.

In FIG. 1, using as the elastic sheet 2 a 100- μm thick silicone rubber sheet and as the piezoelectric tuning fork 3 a tuning fork of elinvar whose vibrating legs had a width of 2.5 mm and a length of 17 mm and were 3.5 mm apart and whose resonance frequency was about 1,500 Hz, the detection sensitivity was measured, and it was found that when a load of 2 mg/mm$^2$ was imposed on the elastic sheet 2 of the detecting section, the piezoelectric tuning fork stopped vibration and when the load was removed it vibrated again. It can be seen from this result that the level of a powder or other object can be detected with high sensitivity. Further, the detection sensitivity can be adjusted by changing the cross-sectional area of the pillar 7, the place of installation of the pillar 7, and the material and thickness of the sheet 2.

In the embodiment described above, since the piezoelectric tuning fork 3 is contained in the case 1 and since an object of detection such as a powder contacts the detecting section of the elastic sheet 2, there is no danger whatsoever of the powder sticking to the vibrating legs 3a and 3b to cause malfunction. Particularly in cases where the area of the elastic sheet 2 is small, the influence of the powder stuck to the elastic sheet 2 can be reduced more effectively. Preferably, the other end of the pillar 7 is contacted with the elastic sheet 2 instead of being fixed thereto, in which case the arrangement can be constructed so that a mere load as caused by the powder stuck to the elastic sheet 2 is not sufficient to constrain the vibration of the piezoelectric tuning fork 3. With this arrangement, malfunction due to the powder being stuck to the elastic sheet 2 can be prevented substantially completely. Further, since in this embodiment the piezoelectric tuning fork 3 is contained in the case 1, there is no possibility of the piezoelectric elements being deteriorated by the object of detection. Further, the detection sensitivity can be adjusted very easily by adjusting the material and thickness of the elastic sheet 2 and the cross-sectional area and position of installation of the pillar 7.

Figure 6:
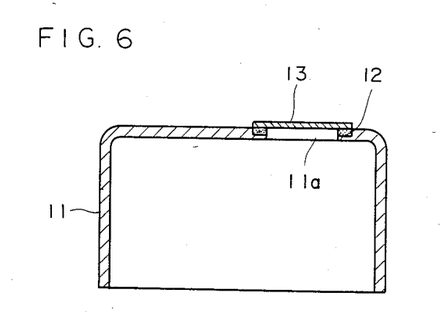
FIG. 6 is a sectional view showing a modification of the movable detecting section.
Figure 7:
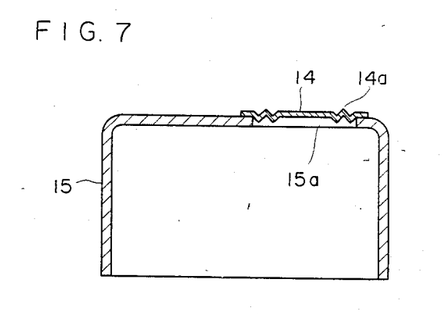
FIG. 7, is a sectional view showing another modification of the movable detecting section.
Figure 8:
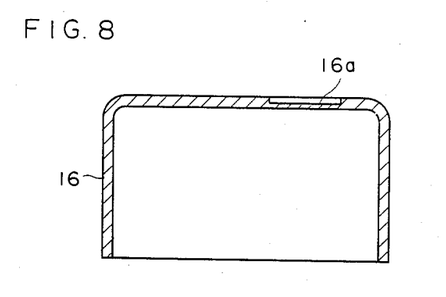
FIG. 8 is a sectional view showing still another modification of the movable detecting section.

Referring to FIGS. 6 through 8, modifications of the movable detecting section will now be described.

FIG. 6 shows a construction wherein a case 11 has a hole 11a peripherally formed with a step to which a sheet 13 is bonded by an elastic adhesive agent 12 made of rubber. In this case, the sheet 13, unlike the aforesaid elastic sheet 2, may be an nonelastic sheet, such as a metal sheet or resin sheet. In the construction shown in FIG. 6, since the elasticity of the elastic adhesive agent 12 of rubber allows the sheet 13 to move, even if the sheet 13 has no elasticity, it is possible to transmit the load on the sheet 13 to the detecting vibrating leg to constrain the vibration of the piezoelectric tuning fork 3.

FIG. 7 shows an arrangement wherein a sheet 14 having peripheral corrugations 14a is fixed to the periphery of a hole 15a in a case 15. In this movable detecting section, since the sheet 14 is movable because of the presence of the corrugations 14a, the sheet 14 serves as the movable detecting section.

FIG. 8 shows an arrangement wherein part of a case 16 of elastic material such as rubber is thin-walled and this thin-walled portion 16a serves as the movable detecting section.

Figure 9:
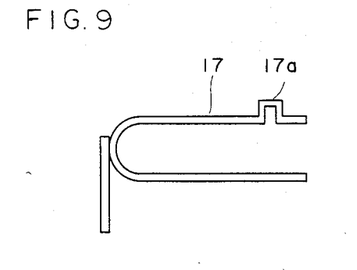
FIG. 9 is a side view showing a modification of the piezoelectric tuning fork serving as a piezoelectric vibrator.
Figure 10:
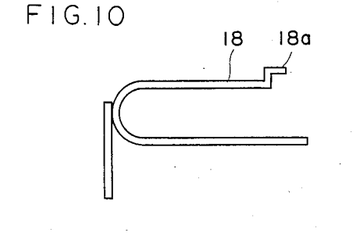
FIG. 10 is a side view showing a further modification of the piezoelectric tuning fork.
Figure 11:
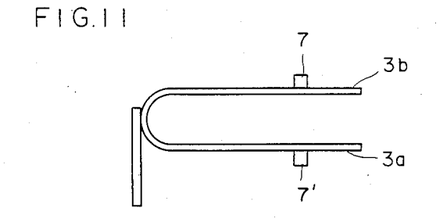
Fig. 11 is a side view showing still a further modification of the piezoelectric tuning fork.

FIGS. 9 through 11 show modification of the piezoelectric tuning fork.

FIG. 9 shows a construction wherein without using the pillar 7 shown in FIG. 1, the detecting vibrating leg 17 for a piezoelectric tuning fork is bent to project a portion thereof, and the projecting portion 17a is contacted with or fixed to the sheet of the detecting section. FIG. 10 shows a construction wherein the reception-purpose vibrating leg 18 of a piezoelectric tuning fork is bent to form a step 18a, which is contacted with or fixed to the sheet of the detecting section. The examples shown in FIGS. 9 and 10 have an advantage that they can be produced very easily since it is only necessary to bend the vibrating leg of the piezoelectric tuning fork.

FIG. 11 shows a construction wherein the exciting vibrating leg 3a of a piezoelectric tuning fork is also provided with a pillar 7' similar to a pillar 7 on the detecting vibrating leg 3b. Since the vibrating legs 3a and 3b become equal in mass, their vibrating conditions become exactly the same, so that the operation is stabilized.

Figure 12:
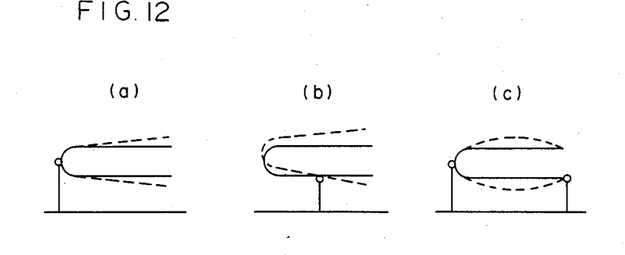
FIG. 12 is a schematic side view showing piezoelectric tuning fork supporting methods and resonance modes.

FIGS. 12A, 12B and 12C show piezoelectric tuning fork supporting methods and vibrating modes; of these figures, FIG. 12A corresponds to the embodiment shown in FIG. 1. In this invention, as shown in FIG. 12B, the excitation vibrating leg may be supported at an intermediate point, or as shown in FIG. 12C, the piezoelectric tuning fork may be supported at two points, one at the bend of the fork and the other at the open end of the excitation vibrating leg.

While the embodiments described so far have used a U-shaped piezoelectric tuning fork, the piezoelectric tuning fork used in this invention may be a W-shaped tuning fork, in which case the intermediate vibrating leg may be supported.

In the above constructions, the pillar 7, projecting portion 17a and step 18a have been provided on the receiving vibrating leg, but such a pillar may be formed on the detecting section, thereby connecting the detecting section and the receiving vibrating leg.

Further, in the constructional examples described above, the detecting section and the receiving vibrating leg are contacted with or fixed to each other by a pillar, projection portion and step. However, this invention is not limited thereto, and there may be provided a clearance therebetween. In brief, it is only necessary that the load on the detecting section be able to constrain the vibration of the piezoelectric tuning fork.

While the arrangement described has been such that the load on the detecting section is transmitted to the reception-purpose vibrating leg to constrain the vibration, an arrangement is also possible wherein the load is transmitted to the exciting vibrating leg or both the reception and exciting-purpose vibrating legs to constrain the vibration.

Figure 13:
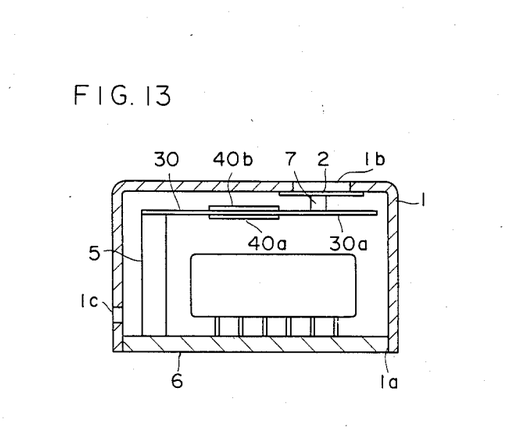
FIG. 13 is a sectional view of a load-sensitive level detecting device according to another embodiment of this invention, wherein a piezoelectric tuning bar is used as a piezoelectric vibrator.
Figure 14:
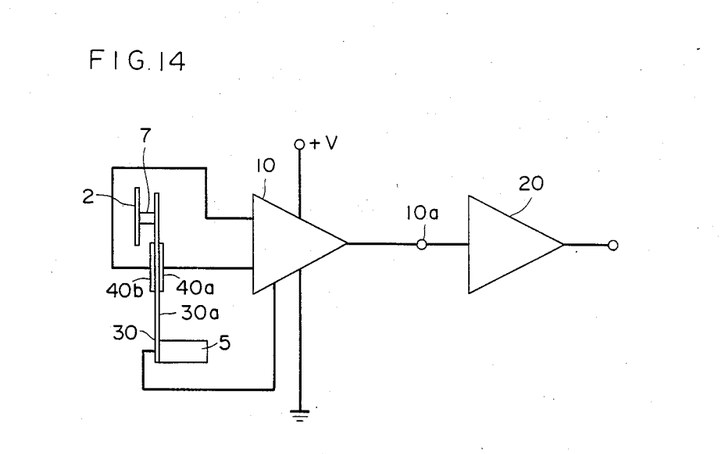
FIG. 14 is a circuit diagram of the load-sensitive level detecting device shown in FIG. 13.

FIG. 13 is a lateral sectional view of a load detecting device according to another embodiment of the invention and corresponds to FIG. 1 described above. FIG. 14 is a circuit diagram of the embodiment shown in FIG. 13 and corresponds to FIG. 3 described above. The difference from the load detecting device of FIG. 1 lies in the fact that as a piezoelectric vibrator, a piezoelectric tuning bar 30 is used instead of the piezoelectric tuning fork 3. Therefore, in order to facilitate the understanding of the load detecting device shown in FIG. 13, only the difference will be described. First, in this embodiment, the piezoelectric tuning bar 30 has an exciting piezoelectric element 40a bonded to one surface thereof and a receiving piezoelectric element 40b bonded to the other surface. One end of the piezoelectric tuning bar 30 is attached to a base plate 6 by a support 5. The other end of the piezoelectric tuning bar 30 has a pillar 7 attached thereto. The pillar 7 is contacted with or fixed to an elastic sheet 2.

Figure 15:
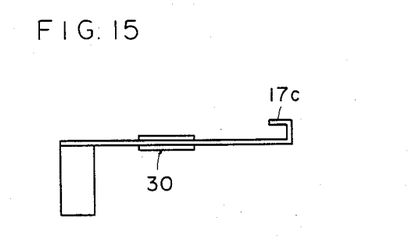
FIG. 15 is a side view showing a modification of the piezoelectric tuning bar serving as a piezoelectric vibrator.
Figure 16:
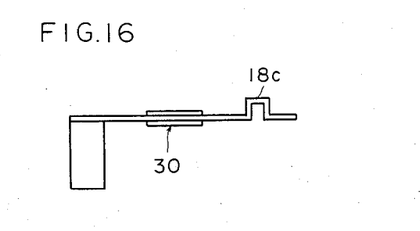
FIG. 16 is a side view showing another modification of the piezoelectric tuning bar.

The pillar 7 is attached to the piezoelectric tuning bar 30, but it may be made integral with the latter. That is, as shown in FIG. 15, part of the vibrating leg of the piezoelectric tuning bar 30 may be bent to project and the projecting portion 17c may be contacted with or fixed to the sheet of the detecting section. Similarly, as shown in FIG. 16, the vibrating leg of the piezoelectric tuning bar may be bent to form a step 18c, which may be contacted with or fixed to the sheet of the detecting section. In the arrangements shown in FIGS. 15 and 16, the production is very easy since it is only necessary to bend the vibrating leg of the piezoelectric tuning bar 30.

Figure 17:
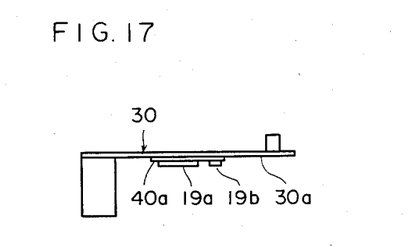
FIG. 17 is a side view showing a further modification of the piezoelectric tuning bar.

FIG. 17 shows a self-excitation type piezoelectric tuning bar 30 having a piezoelectric element 40a bonded to one surface of the vibrating leg thereof, said piezoelectric element 40a having an exciting-purpose electrode 19a and a feedback electrode 19b mounted thereon.

In the embodiment using a piezoelectric tuning bar described above, i.e., the embodiment shown in FIG. 13, the pillar 7, projecting portion 17c and step 18c are provided on the vibrating leg of the piezoelectric tuning bar 30, but the invention is not limited thereto. The detecting section and the vibrating leg may be connected together by forming the detecting section with a pillar or the like.

As for the piezoelectric element used for the piezoelectric tuning bar, a bimorphic piezoelectric element may, of course, be used.

Figure 18:
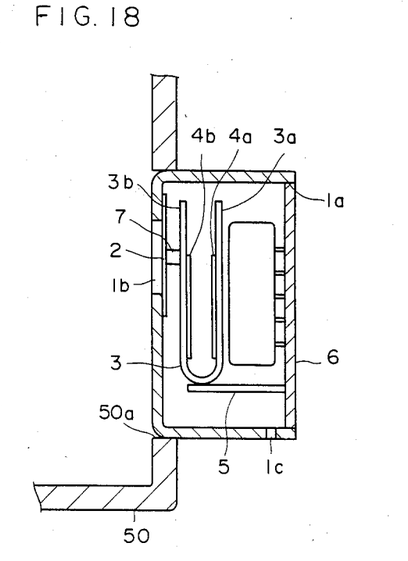
FIG. 18 is a lateral sectional view, wherein a load-sensitive level detecting device according to an embodiment of this embodiment is fixed to a hopper which stores and supplies a powder or liquid.
Figure 19:
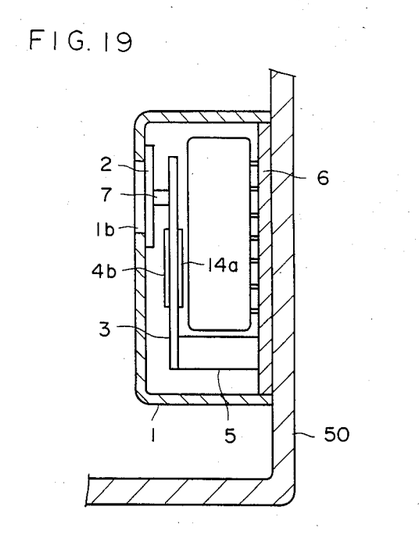
FIG. 19 is a lateral sectional view, wherein a load-sensitive level detecting device according to another embodiment of this invention is fixed, as in FIG. 18, to a hopper which stores a powder or liquid.

FIGS. 18 and 19 are fragmentary side views showing the FIG. 1 and 13 embodiments, each fixed to the side wall of a container 50. The construction of each detecting section is exactly the same as that shown in FIG. 1 or 13 described above, so that a description thereof is omitted by marking the components with the same reference numerals. The features of the constructions shown in FIGS. 18 and 19 are that the load detecting device is fixed to the side wall of the container 50, with the elastic sheet 2, constituting the movable detecting section, being directed to the interior of the container 50. Thus, in the constructions shown in FIGS. 18 and 19, since the load detecting device is fixed to the container 50, the level of various powders or liquids stored in or fed to the container 50 can be accurately detected. For example, if the container 50 is a toner storage container for a duplicating machine, the remaining amount of the toner can be detected, and it is also possible to use the container 50 as a container for storing particulate cereals such as wheat or rice. Further, when the container is used as a container for storing juice or coffee in an automatic vending machine, the level of the beverage can be accurately detected. In this way the invention can be utilized extremely effectively in various fields where detection of the level of a powder or liquid is required.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A load sensitive level detectng device for detecting the level of a material in powder or liquid form, said device comprising:
    a piezoelectric vibrator including a U-shaped piezoelectric tuning fork having first and second vibrating legs and a base section connecting said legs, said tuning fork being mechanically supported at said base section;
    isolating means for isolating said piezoelectric tuning fork from the material whose level is being detected, said isolating means being exposed to said material and being connected to said tuning fork at said second vibrating leg whereby said isolating means mechanically dampens the vibration of said second vibrating leg when a load is applied to said isolating means by said material; and
    means for exciting said first vibrating leg so as to cause said first vibrating leg to vibrate and for detecting the vibration of said second vibrating leg so as to determine if the vibration of said second vibrating leg is being dampened by said material.

2. A load-sensitive level detecting device as set forth in claim 1, wherein said isolating means comprises a case having an opening in a portion of its wall surface and surrounding said piezoelectric vibrator, and a movable detecting section closing said opening.

3. A load-sensitive level detecting device as set forth in claim 2, wherein said means comprises:
    a detecting piezoelectric element located on said second vibrating leg and an exciting piezoelectric element located on said first vibrating leg; and
    means for amplifying a signal from said detecting piezoelectric element and applying said signal to said exciting piezoelectric element for achieving a positive feed back loop.

4. A load-sensitive level detecting device as set forth in claim 1, wherein said means comprises:
    a detecting piezoelectric element located on said second vibrating leg and an exciting piezoelectric element located on said first vibrating leg; and
    means for amplifying a signal from said detecting piezoelectric element and applying said signal to said exciting piezoelectric element for achieving a positive feed back loop.

5. A load-sensitive level detecting device as set forth in claim 1, wherein said isolating means includes a thin membrane which is exposed to said material and means for directly mechanically coupling said membrane to said second vibrating leg.

6. A load-sensitive level detecting device as set forth in claim 5 wherein said coupling means ia a rubber body.

* * * * *